Jan. 23, 1934.   H. A. GATES   1,944,554
INDICATOR
Filed June 9, 1932

INVENTOR
Howard A. Gates
BY
ATTORNEY

Patented Jan. 23, 1934

1,944,554

UNITED STATES PATENT OFFICE 1,944,554

INDICATOR

Howard A. Gates, Buffalo, N. Y., assignor to Colonial Radio Corporation, Buffalo, N. Y., a corporation of New York Application June 9, 1932. Serial No. 616,214

3 Claims. (Cl. 116—124.3)

This invention relates to indicators for use in showing the position of an adjustable or movable element and has particular application to radio receiving apparatus, for example, for use in showing the relative adjustment of the tuning apparatus. However, it will be understood that my invention is not limited to use with radio receiving apparatus, but may be employed in many arrangements in which a dial or indicator is desired to show the position of a movable or adjustable element.

It is an object of this invention to provide an indicator of the class described which will correctly show the relative positions of a movable or rotary mechanism and which at the same time will accommodate itself to the use of a considerably larger scale than those heretofore in use.

It is a further object of this invention to provide an arrangement of the class described comprising a dial and pointer both of which are movable in a predetermined manner, whereby a greater range of variation may be obtained than in the case of indicators in which the pointer or the dial is fixed in position.

It is still a further object of my invention to provide apparatus of the class described in which the dial may accommodate a plurality of scales and in which the pointer may be provided, in effect, with a plurality of indicators each corresponding to a particular scale.

It is still a further object of my invention to provide apparatus of the class described which shall be relatively simple and inexpensive to construct and rugged and reliable in operation and in which backlash is minimized, if not entirely eliminated.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a sectional elevation view of one form of apparatus according to my invention, and Fig. 2 is a front elevation thereof.

Figure 1:
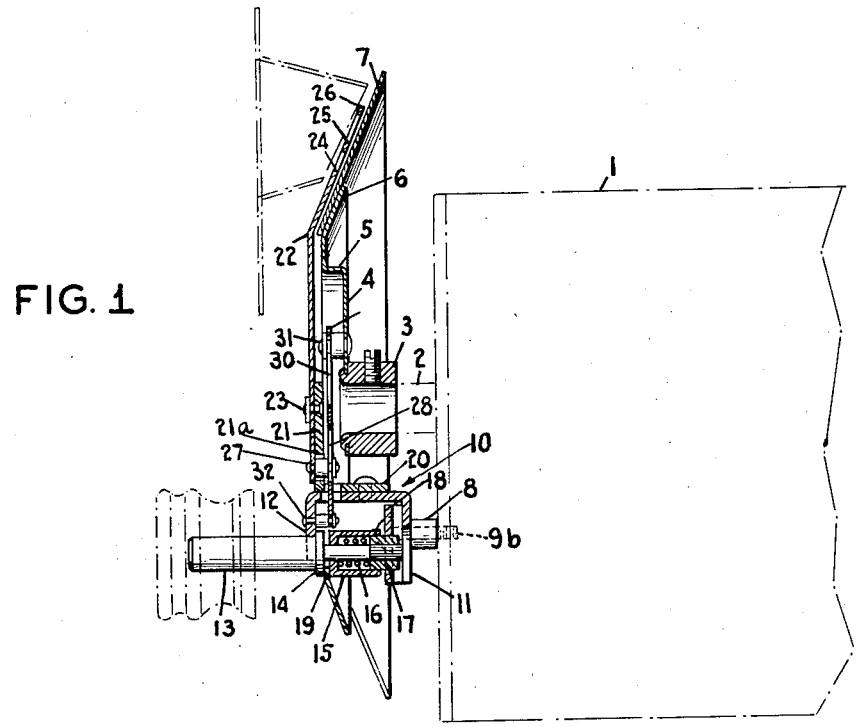
Figure 2:
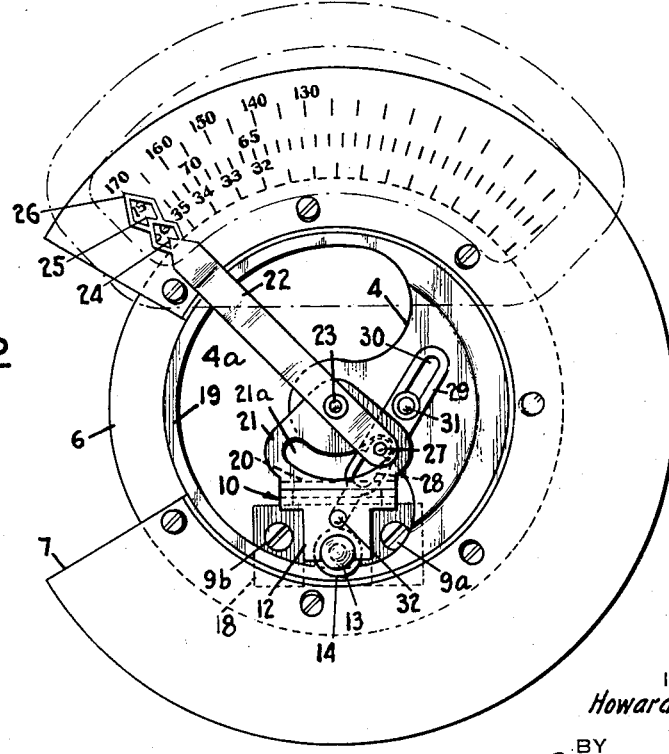

Referring now more particularly to Fig. 1, 1 indicates a variable element, the relative position or adjustment of which is to be shown by the dial or indicator. It will be understood that the precise nature of this element is not a part of my invention, but in radio receiving apparatus the variable element 1 is usually a variable condenser, operated by shaft 2.

In accordance with my invention I provide a collar 3 on the shaft 2 fixed thereon in any suitable manner, as for example, by means of a set screw, and secured to the collar 3 I provide the dial frame 4. This may be secured to the collar 3 in any desired manner, for instance, as shown, by being mounted upon a shoulder on the collar 3 which is afterwards upset or peened over to hold the dial carrier in position. The dial carrier is generally circular in form, the center part being plain and a shoulder 5 being formed near the periphery. Preferably, although not necessarily, the periphery 6, is slightly beveled and the entire dial carrier 4 may be stamped in proper shape.

The center portion of the dial carrier 4 is cut away as indicated at 4a forming an approximately U shaped opening to permit rotation of the dial carrier through 180 degrees. Secured to the periphery 6 of the dial carrier 4 I may provide the annular transparent dial 7 which it will be noted extends slightly more than 270 degrees, thereby providing for the use of a scale covering 270 degrees.

Secured to the frame or casing of the variable element 1 I provide a U shaped bracket 10 having a downwardly depending rear portion 11 and front portion 12. The bracket may be spaced from the frame of the variable element 1 by means of sleeves or collars 8 through which are passed bolts 9a and 9b engaging tapped holes in the frame.

Mounted in suitable bearings in the front wall of the bracket 10 and in an auxiliary plate 18 carried by the rear wall thereof, I provide the operating shaft 13 which may carry at its outer end an operating knob. The shaft 13 is provided with a collar 14, the front face of which engages the rear face of the front wall of the bracket 10. The rear portion of the shaft 13 is reduced in diameter and mounted thereon is provided a hollow sleeve 15 within which there is provided a spring 16 and a second sleeve 17 fitting within the sleeve 15 and fastened to the shaft 13. Sleeve 17 fits within a bearing opening in plate 18 secured to the wall 11 of bracket 10 and the clearances are such that the front face of sleeve 15 is biased toward collar 14 through the action of spring 16. The inner edge 19 of the dial carrier 4 is frictionally engaged between collar 14 and sleeve 15, whereby, as will be understood, upon rotation of shaft 13 the dial carrier is rotated at a slower rate of speed.

Secured to the horizontal portion of the bracket 10 I provide a second bracket having base portion 20 and an upwardly extending face portion 21. A pointer 22 is pivoted at 23 on the face 21 of the second bracket. The pointer may be provided with a plurality of fingers 24, 25 and 26, the inner portions of which are cut away to permit the use of a plurality of scales on the dial face. The opposite end of the pointer is provided with a pin 27 which engages a slot 28 in link 29 which is pivoted at its lower end at 32 upon the rear side of the face 12 of bracket 10. The free end of link 29 is provided with a slot 30 engaging a pin 31 mounted on the dial carrier 4. The face 21 of the second bracket is provided with an arcuate slot 21a to permit pin 27 to pass therethrough.

The operation of the structure is as follows:

Starting from the position shown in Fig. 2, if the knob be rotated counter-clockwise, through the action of collar 14 and sleeve 15 the dial carrier 4 and the dial 7 will also be rotated counter-clockwise. This action causes a movement of pin 31 to the left, thereby swinging link 29 in a counter-clockwise direction on pivot 32. This movement of link 29, through the engagement of pin 27 in slot 28 of link 29, swings the pointer 22 in a clockwise direction, whereby as the dial rotates in a counter-clockwise direction the pointer rotates in a clockwise direction at a slower speed.

I prefer to so arrange and proportion the links and to select the pivot points that the pointer 22 moves through 90 degrees, that is to say, from a position 45 degrees inclined to the vertical on one side to a position of 45 degrees inclined to the vertical on the other side, while at the same time the dial is moving through 180 degrees in the opposite direction. It will be understood, however, that by suitably choosing the lengths of the various links and the positions of the various pivots other combinations of movement may be obtained.

An escutcheon plate may be provided, as shown in dotted lines, having an arcuate opening arranged to expose the pointer, whatever its position may be. In the present arrangement, the opening in the escutcheon plate may subtend an angle of a little more than 90 degrees.

While I have shown and described certain preferred embodiments of my invention, it will be understood that modifications and changes may be made without departing from the spirit and scope thereof, as will be understood by those skilled in the art.

I claim:

1. Indicating apparatus comprising, in combination, a rotary element, a dial carried thereby, a frame, a pointer pivoted on said frame for rotation across said dial, a link pivoted on said frame at one end and having its other end carried by said rotary element and a connection between said link and said pointer.

2. Indicating apparatus comprising, in combination, a rotatable element, a dial carried thereby, a frame, a pointer pivoted intermediate its ends on said frame, a link pivoted at one end on said frame and having its other end slidably engaging said rotatable element, and a connection between one end of said pointer and an intermediate point on said link.

3. Indicating apparatus comprising, in combination, a rotatable element, a dial carried thereby, a frame, a pointer pivoted intermediate its end on said frame and having one end cooperating with said dial, a link pivoted at one end on said frame at a point offset from the pivot of said pointer, a pin on said rotatable element slidably engaging the free end of said link and a lost motion connection between the opposite end of said pointer and an intermediate point on said link.

HOWARD A. GATES.